United States Patent
Steinkamp et al.

(10) Patent No.: US 7,552,653 B2
(45) Date of Patent: Jun. 30, 2009

(54) LOAD-SENSING SYSTEM WITH AT LEAST ONE BALL AND SOCKET JOINT

(75) Inventors: Uwe Steinkamp, Osnabrück (DE); Martin Kornhage, Merzen (DE); Alfons Hegemann, Merzen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 10 days.

(21) Appl. No.: 11/577,626

(22) PCT Filed: Oct. 22, 2005

(86) PCT No.: PCT/DE2005/001900

§ 371 (c)(1),
(2), (4) Date: Apr. 20, 2007

(87) PCT Pub. No.: WO2006/042537

PCT Pub. Date: Apr. 27, 2006

(65) Prior Publication Data

US 2007/0261502 A1    Nov. 15, 2007

(30) Foreign Application Priority Data

Oct. 21, 2004    (DE) ........................ 10 2004 051 504

(51) Int. Cl.
*G01L 3/02*    (2006.01)
(52) U.S. Cl. .................................. 73/862.22
(58) Field of Classification Search ............. 73/862.21, 73/862.22
See application file for complete search history.

(56) References Cited

U.S. PATENT DOCUMENTS

| | | | | |
|---|---|---|---|---|
| 3,900,953 A | * | 8/1975 | Posen | 433/72 |
| 4,348,634 A | * | 9/1982 | David et al. | 323/353 |
| 4,550,617 A | | 11/1985 | Fraignier et al. | |
| 4,913,155 A | * | 4/1990 | Dow et al. | 600/446 |
| 5,851,151 A | * | 12/1998 | Reynolds | 464/106 |
| 5,929,846 A | * | 7/1999 | Rosenberg et al. | 345/161 |
| 6,105,438 A | | 8/2000 | Gieseke | |
| 6,931,947 B2 | * | 8/2005 | Schulze et al. | 73/862.381 |
| 7,297,090 B2 | * | 11/2007 | Torres | 482/74 |
| 2004/0067096 A1 | | 4/2004 | Ersoy et al. | |
| 2007/0040355 A1 | * | 2/2007 | Spratte et al. | 280/511 |

FOREIGN PATENT DOCUMENTS

| | | |
|---|---|---|
| DE | 29 17 966 | 11/1980 |
| DE | 101 07 279 A1 | 8/2002 |
| WO | WO 2005/015146 A1 | 2/2005 |

\* cited by examiner

*Primary Examiner*—Max Noori
(74) *Attorney, Agent, or Firm*—McGlew and Tuttle, P.C.

(57) ABSTRACT

A load-sensing system is provided with at least one ball and socket joint and a ball and socket joint for load sensing is provided. The ball and socket joint of the load-sensing system has a joint housing, in which the joint ball of a ball pivot (1) can be received in a slidingly movable manner. The ball pivot (1) comprises a shaft area and a joint ball, a load-sensing means (3) being arranged in the shaft area of the ball pivot. The load-sensing system is characterized according to the present invention by an evaluating means, which is set up such that the signals of the load-sensing means (3) are output as a vector in a cartesian coordinate system. The load sensing makes it possible to reliably determine the operating or load state not only of individual components but rather of entire assembly units of a motor vehicle and with which the vehicle dynamics can be adjusted.

22 Claims, 3 Drawing Sheets

LOAD-SENSING SYSTEM WITH AT LEAST ONE BALL AND SOCKET JOINT

CROSS REFERENCE TO RELATED APPLICATIONS

This application is a United States National Phase application of International Application PCT/DE2005/001900 and claims the benefit of priority under 35 U.S.C. § 119 of German Patent Application 10 2004 051 504.2 filed Oct. 21, 2004, the entire contents of which are incorporated herein by reference.

FIELD OF THE INVENTION

The present invention pertains to a load-sensing system with at least one ball and socket joint for sensing loads and/or torques, for example, in the area of the chassis or the wheel suspension of motor vehicles. Furthermore, the present invention pertains to a ball and socket joint with a load-sensing feature, especially for a load-sensing system according to the present invention.

BACKGROUND OF THE INVENTION

Load-sensing means of the type mentioned in the introduction are used, for example, but by no means exclusively, in motor vehicles in order to make it possible to reliably measure the loads or torques occurring during the experimental operation on the test bench or during real travel.

Such a load-sensing means is known, for example, from DE 101 07 279 A1. The load-sensing means known from this document is used to determine or evaluate the load acting in a certain component of a motor vehicle, for example, the axial load present in a track rod because of reaction loads from the chassis. Provisions are made for this according to the teaching of this document, among other things, for providing a ball and socket joint arranged between different components of the steering linkage with a wire strain gauge and to infer the axial loads acting in the steering linkage or in the track rod of interest on the basis of the signals of this wire strain gauge.

However, the benefit of this prior-art load-sensing means is limited. Thus, as was described, essentially only a load acting in a certain component in a certain direction can be determined with this load-sensing means. The prior-art load-sensing means is thus unsuitable for determining more complex load situations, as they occur, for instance, on larger assembly units or on the motor vehicle as an overall system.

SUMMARY OF THE INVENTION

Against this background, the object of the present invention is to provide a load-sensing system or a ball and socket joint with a load-sensing means, with which the drawbacks of the state of the art can be overcome. In particular, the load-sensing system or the ball and socket joint shall make possible the extensive vectorial determination of loads and/or torques in a simple and reliable manner as well as with a great degree of freedom allowed by the design. An essential focus shall be on the possibility of directly determining the load situation of entire assembly units and optionally of an entire motor vehicle.

The load-sensing system according to the present invention comprises, in a manner known at first per se, at least one ball and socket joint. The ball and socket joint has a joint housing, in which the joint ball of a ball pivot can be received in a slidingly movable manner, the ball pivot comprising a shaft area and a joint ball. In a likewise known manner, a load-sensing means is arranged in the shaft area of the ball pivot of the at least one ball and socket joint of the load-sensing system.

The load-sensing system is characterized according to the present invention by an evaluating means, which is set up such that the signals of the load-sensing means are outputted as a load vector or as a combination of load vector and torque vector in a cartesian coordinate system.

In other words, this means at first that the load-sensing system comprises not only a force transducer but rather an array of a plurality of force transducers or load sensors. The force transducers may be arranged, for example, at one and the same ball and socket joint. However, it is equally possible and provided for that the load-sensing system comprises a plurality of ball and socket joints, at which one or more force transducers are arranged.

The signals of all force transducers or load sensors are processed by the evaluating means of the load-sensing system according to the present invention such that the result of the signal processing is output in the form of a load vector or a combination of a load vector and a torque vector.

This is advantageous insofar as complex load situations in the three-dimensional space can also be readily determined in this manner by means of a comparatively simple ball and socket joint or optionally also by means of a plurality of ball and socket joints, always with force transducers.

The location of the at least one ball and socket joint or the point of an array of a plurality of ball and socket joints with load sensors to which the load vector or the combination of load vector and torque vector is related is not essential here for the present invention.

However, it is advantageous, especially in case of load-sensing systems with only one ball and socket joint, if the evaluating unit is set up such that the origin of the load vector calculated from the signals of the load-sensing means is located in the center of the joint ball of the ball and socket joint. A load vector related to the center of the joint ball can be subjected to further use in an especially simple manner and universally for subsequent force and load calculations.

According to a preferred embodiment of the present invention, the load-sensing means of a ball and socket joint comprises a plurality of load sensors for different load directions, the load sensors preferably being distributed uniformly over the circumference of the shaft area of the ball pivot. The load sensors are arranged now especially preferably essentially in parallel to the direction of the longitudinal axis of the ball pivot.

It is thus also possible to determine loads in all three directions of the cartesian space with only a small number of ball and socket joints or optionally even with a single ball and socket joint. If the load sensors are arranged such that they are distributed over the circumference of the shaft area of the ball pivot uniformly as well as in the longitudinal direction of the ball pivot, the undesired crosstalk of the individual load sensors is minimized in this manner. Furthermore, the shaft area of the ball pivot is utilized in this manner as a transverse beam in a manner optimal for load sensors in order to thus make it possible to determine the acting loads with high precision.

According to another preferred embodiment of the present invention, at least one load sensor is arranged in an axial central hole of the ball pivot. It becomes possible in this manner, as an alternative or in addition to the load sensors arranged on the outer circumference of the ball pivot shaft, to exactly measure especially the pure tensile and compressive loads acting in the axial direction of the pivot (z direction) separately and to make it possible to separate these from the loads measured in the form of the pivot bending in the x and y directions based on the lowest possible signal crosstalk.

According to another, preferred embodiment of the present invention, the load-sensing system comprises a plurality of ball and socket joints with a load-sensing means each, wherein the evaluating means of the load-sensing system is set up especially preferably such that the signals of the load-sensing means of the plurality of ball and socket joints are output in the form of a load vector or a combination of a load vector and a torque vector. The origin of the corresponding vectors is preferably located now in the center or in a main reference point of the component or the assembly unit on the motor vehicle.

It becomes possible in this manner to equip, for example, all articulation points of the wheel carrier of one of the wheels of a motor vehicle with ball and socket joints that are provided with a load-sensing means each. The signals of all ball and socket joints or the signals of the overall load-sensing means formed from the load sensors of all ball and socket joints are now sent to the evaluating means. The evaluating means will then form a load vector or a combination of load vector and torque vector, taking all input signals into account, from which the complete instantaneous load situation of the corresponding wheel carrier of the motor vehicle can be determined.

The conversion of the signals originating from the load-sensing means of the ball and socket joint or the ball and socket joints into a vector can be carried out, for example, on the basis of a transmission matrix or calibration matrix prepared by means of calibration.

The calibration necessary for this can be carried out, for the hypothetical case of the determination of the load situation of a wheel suspension or a wheel carrier, for example, in such a way that defined, known loads acting in defined directions and/or defined, known torques are applied to the wheel of the motor vehicle in question or to the corresponding wheel carrier under laboratory conditions. Both the signals of the load-sensing means (for example, changes in the resistance of wire strain gauges), which result from the load, and the actually acting loads, which are known in this case, or the associated load vectors are now entered into the evaluating means in a calibration mode. The transmission matrix or calibration matrix, which can be stored in a suitable manner, and on the basis of which all future load situations can be determined directly from the measured combination of the signals of the load-sensing means and outputted vectorially, can be subsequently prepared from this.

Complex load situations on entire assembly units or on the motor vehicle can also be determined in this manner in a simple and reliable manner and at a low cost. Complicated laboratory systems that were hitherto necessary for this, for instance, extremely cost-intensive measuring wheels and the like, or wireless sensor systems arranged in the motor vehicle tire itself, can thus be replaced by a number of comparatively simple ball and socket joints each provided with load sensors.

Provisions are made according to another embodiment of the present invention for the ball and socket joints provided with load sensors to be used not only under laboratory conditions or in the testing operation of, for example, motor vehicles, but also for using such a determination of the load situation of chassis parts on the standard design vehicle. The load of, e.g., the wheel suspension of a motor vehicle, which can thus be determined in real time, can then be advantageously used, for example, to expand the data base for electronic stability programs and the like, as a result of which considerable improvements can be achieved in the driving safety of motor vehicles.

It is similarly conceivable, especially in connection with utility vehicles, that the load-sensing system according to the present invention forms part of a means for the preferably permanent monitoring of the useful load of the vehicle, as a result of which the complicated weighing of utility vehicles on stationary scales for determining the weight of the cargo, which is still used in the state of the art, can be eliminated. Use as an inexpensive service life sensor for components or assembly units also becomes possible thanks to the present invention by the ACTUAL number of load cycles to which the particular component was actually subjected being related to the DESIRED number of load cycles that the corresponding component can theoretically tolerate.

The present invention pertains, furthermore, to a ball and socket joint with load-sensing means. The ball and socket joint has a joint housing and a ball pivot rotatingly and/or pivotingly movable in the joint housing, the ball pivot comprising a joint ball and a shaft area and having a load-sensing means. The ball and socket joint contains a plurality of load sensors, which are arranged in the shaft area of the ball pivot and are distributed over the circumference of the shaft area.

It becomes possible in this manner to determine loads even with a single ball and socket joint vectorially in all three directions of the cartesian space. For example, tensile loads are recorded with uniform intensity in the axial direction of the pivot by all load sensors arranged distributed over the circumference of the shaft area of the ball pivot. The loads that act on the ball and socket joint at right angles to the longitudinal axis of the ball pivot in the x-y plane can likewise be determined in terms of value and direction based on the specific superimposition pattern of the signals of the individual load sensors which now occurs. In the latter load case, the ball pivot represents a transverse beam, in which the determination of the transverse loads acting can be carried out with very high precision, for example, on the basis of a measurement of the edge fiber elongations.

The present invention is embodied regardless of the concrete type and design of the load sensors. However, the load sensors of the ball and socket joint are preferably designed as wire strain gauges. Wire strain gauges are advantageous because they are robust and make possible a high precision of measurement.

According to a preferred embodiment of the present invention, the load sensors are arranged on the surface of the shaft area of the ball pivot. This embodiment makes possible the extremely simple and inexpensive manufacture of the ball and socket joint according to the present invention, because no design modifications need to be carried out on the ball and socket joint itself for mounting the load sensors. Recesses or flat surfaces are provided in the shaft area of the ball pivot according to alternative embodiments of the present invention for receiving the load sensors. This design, which is only slightly more complicated than the above embodiment, has the advantage that an even higher precision can be achieved in terms of both the placement of the load sensors and the determination and the evaluation of the elongations and loads on the ball and socket joint.

According to another embodiment of the present invention, provisions are made for a load sensor to be arranged in an axial central hole of the ball pivot of the ball and socket joint. Especially the pure tensile and compressive loads acting in the axial direction of the pivot can be measured in this manner separately especially exactly and separated from the loads in the x and y directions, which are measured, for instance, in the form of bendings of the pivot, as a consequence of the fact that the signal crosstalk is especially low in this case.

The present invention will be explained in more detail below on the basis of embodiments, which are only exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
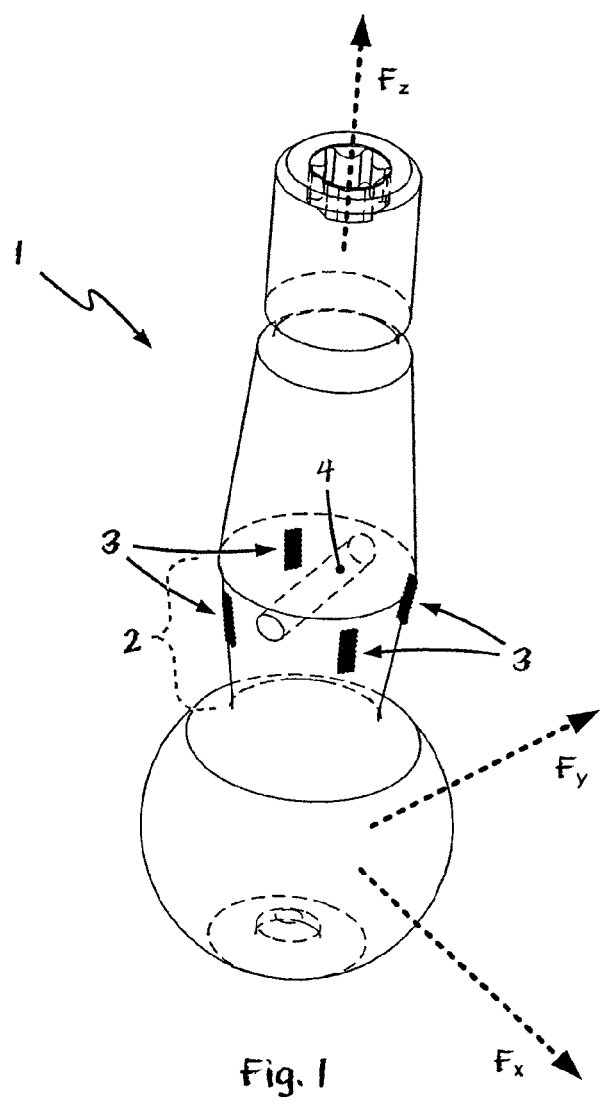
FIG. 1 is a schematic isometric view of a ball pivot for a ball and socket joint of a load-sensing system according to the present invention.

Referring to the drawings in particular, FIG. 1 shows a schematic isometric view of the ball pivot 1 of a ball and socket joint 50, for a load-sensing system 100 according to the present invention.

With the exception of the wire strain gauge 3 arranged in the neck area 2 of the ball pivot 1 as well as with the exception of the cross hole 4, the ball pivot 1 corresponds, unchanged, to a standard ball pivot of a ball and socket joint. This means that a ball and socket joint (50) present, for instance, in the area of the wheel suspension of a motor vehicle, can already be used for the load-sensing system according to the present invention with extremely slight and hence inexpensive modifications.

Four wire strain gauges 3 are arranged distributed on the circumference in the area of the neck 2 of the ball pivot in the exemplary embodiment shown in FIG. 1 in such a way that two adjacent wire strain gauges each form an angle of 90°. Furthermore, the longitudinal axis of the wire strain gauges 3 extends in parallel to the longitudinal axis of the ball pivot 1. Loads acting on the ball pivot 1 can thus be determined already with the four wire strain gauges 3 shown in both the x direction (Fx) and the y direction (Fy) as well as in the z direction (Fz) independently from one another and simultaneously.

This is linked with the fact that, for example, a load acting in the x direction (Fx) is recorded only by the wire strain gauges 3 that are the front wire strain gauge and the rear wire strain gauge relative to the drawing, whereas the wire strain gauge 3 that is the left or right wire strain gauge relative to the drawing does not record any elongation, since the neutral fiber of the ball pivot 1 acting as a transverse beam here extends in load case Fx through the wire strain gauge that is arranged to the left and right of the ball pivot relative to the drawing. This is analogously true in the load case Fy, in which case a corresponding signal is sent only by the two wire strain gauges that are located to the left and right (as shown in FIG. 1) of the ball pivot.

By contrast, all four wire strain gauges 3 are elongated equally strongly in case of a load in the z direction by Fz, so that this load case can also be taken into account. The separation of the signals of the wire strain gauges 3 assigned to the load directions Fx, Fy and Fz can be performed reliably, for example, on the basis of a corresponding interconnection of the individual wire strain gauges 3 into a bridge circuit commonly known to the person skilled in the art or the like or on the basis of the transmission matrix 72 provided by or used with an evaluating means 70, for receiving the load signals of the strain gauges and providing an output in the form of a load vector or as a combination of load vector and torque vector in a cartesian coordinate system.

In addition, a cross hole 4 through the ball pivot 1 is also recognized in FIG. 1. The cross hole 4 is used to duct the cable in a bundled form and hence in a more robust and simple manner to the individual wire strain gauges 3.

FIG. 2 once again shows the ball pivot 1 according to FIG. 1 in a side view, in which both the wire strain gauges 3 and the cross hole 4 are clearly recognizable. In the ball pivot 1 according to FIGS. 1 and 2, the cable bundle 40 of the wire strain gauges 3 exiting from the cross hole 4 is led out in the area of the sealing bellows of the corresponding ball and socket joint, which sealing bellows is not shown here. This especially inexpensive embodiment can be used especially when only small tilting and/or angle of rotation motions occur on the particular ball and socket joint during operation.

Figure 2:
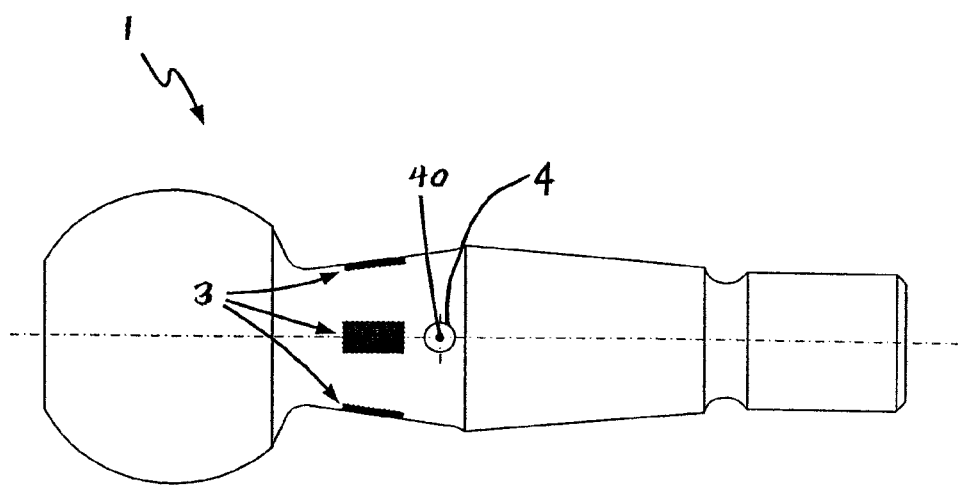
FIG. 2 is a schematic side view of the ball pivot according to FIG. 1.
Figure 3:
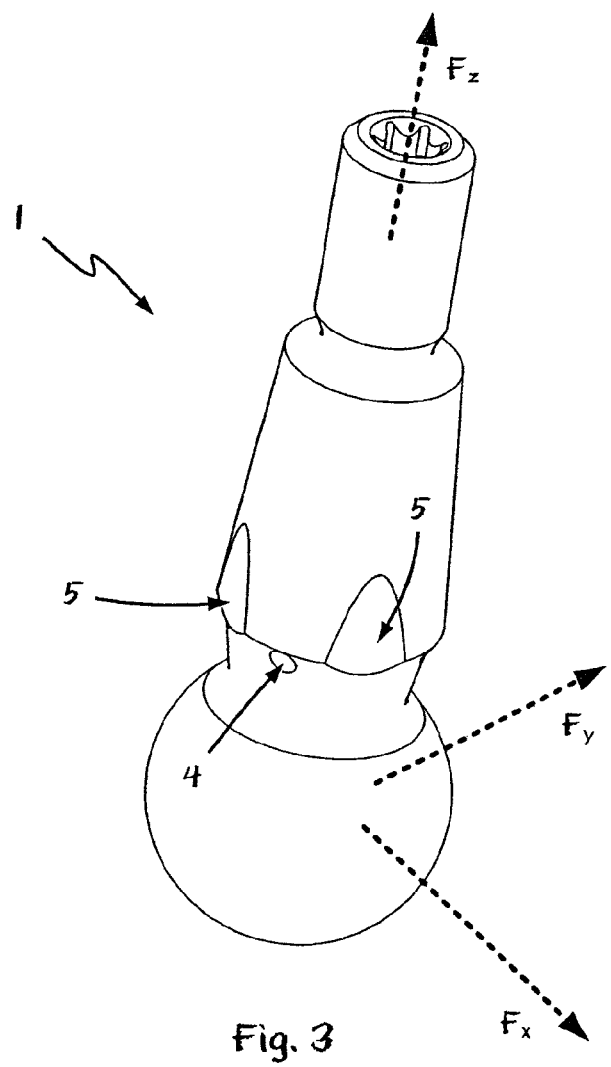
FIG. 3 is schematic isometric view, similar to the view of FIG. 1, of a ball pivot for a ball and socket joint of another embodiment of a load-sensing system according to the present invention.
Figure 4:
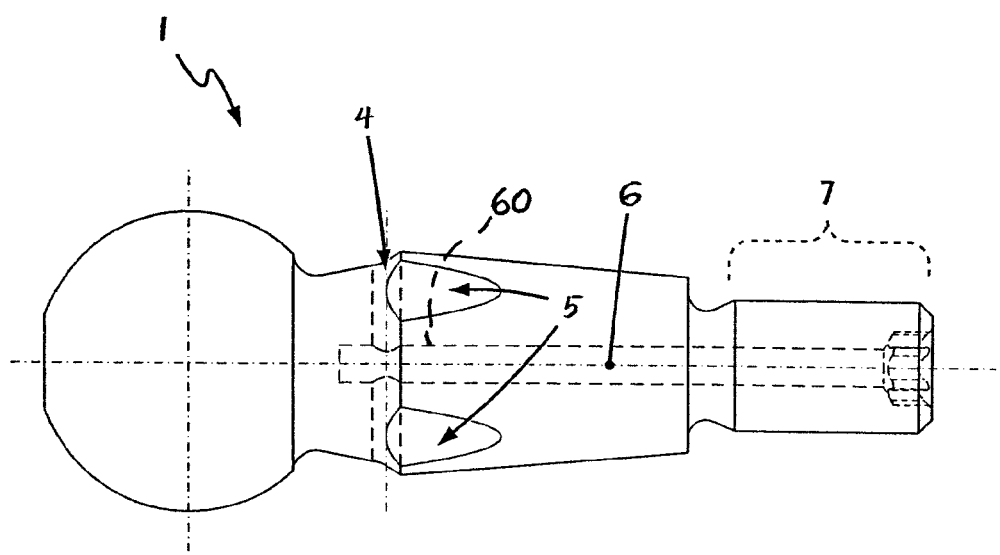
FIG. 4 is a schematic side view, similar to the view of FIG. 2, showing the ball pivot according to FIG. 3.
Figure 5:
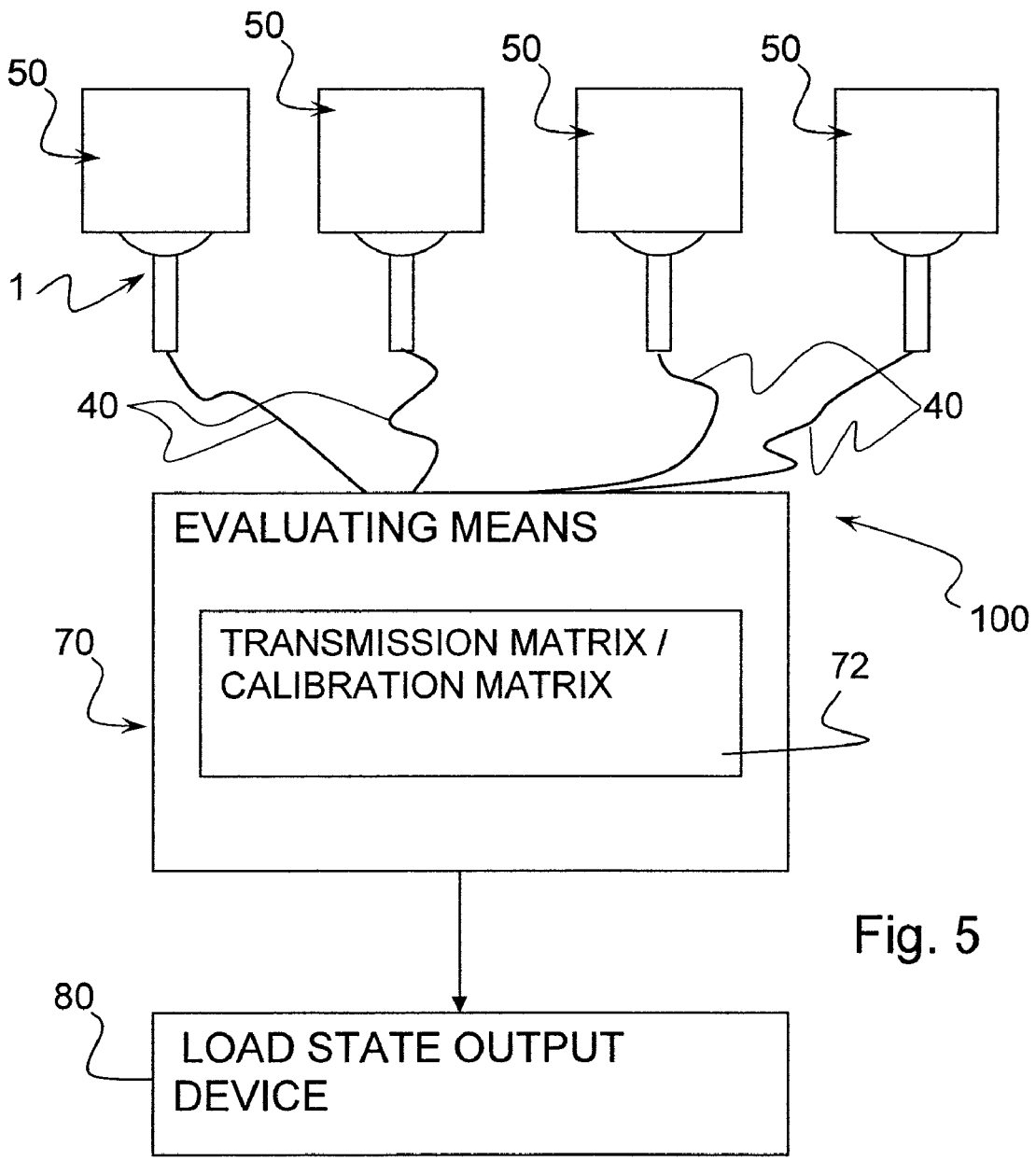
FIG. 5 is a schematic view of a load-sensing system according to the invention.

FIGS. 3 and 4 show the ball pivot 1 of a ball and socket joint for another embodiment of a load-sensing system according to the present invention. The ball pivot 1 according to FIGS. 3 and 4 differs from the ball pivot 1 according to FIGS. 1 and 2 primarily by the plane faces 5, which are milled in the shaft area of the ball pivot 1 and are used to arrange the wire strain gauges 3, not shown in FIGS. 3 and 4. This design, which is only slightly more complicated than the embodiment according to FIGS. 1 and 2, has the advantage that greater precision can be reached in terms of both the placement of the wire strain gauges 3 and the determination and the evaluation of the elongations or loads on the ball pivot 1.

Another difference between the ball pivot 1 according to FIGS. 3 and 4 and the ball pivot 1 according to FIGS. 1 and 2 is that not only the cross hole 4 but also a longitudinal hole 6 are present in the ball pivot 1 according to FIGS. 3 and 4.

The longitudinal hole 6 may be used for two different purposes. For example, the connection cables 40 coming from the wire strain gauges 3 can be introduced into the cross hole 4 in a bundled form and led out by means of the longitudinal hole 6 on the front side of the threaded area 7 of the ball pivot 1. This ducting of cable 40 has the advantage that, in principle, tilting and/or angle of rotation motions of any size of the particular load-sensing system can be allowed in this manner, without there being any risk of damage to the cables leading to the wire strain gauges 3 in the area of the plane faces 5.

The other possibility of using the longitudinal hole 6 is that in addition or as an alternative to the cable ducting mentioned, another force transducer or wire strain gauge 60, which is preferably used to determine the loads in the longitudinal direction of the ball pivot 1, can also be arranged in the longitudinal hole 6. An even better uncoupling and separation of the signals in regard to the load directions Fx, Fy and Fz is possible in this manner.

Thus, it becomes clear as a result that thanks to the present invention, a load-sensing system 100 or a ball and socket joint 50 is provided especially for use in a motor vehicle, which makes possible the reliable determination of the operating state and the load state at a load state output device 80 (display, memory—data base for electronic stability system, electronic monitoring system, service life sensor system, etc.) not only of individual components, but rather of entire assembly units of a motor vehicle. The load-sensing system 100 according to the present invention can also replace other, considerably more complicated measuring systems, for example, electronic odometers or even wireless sensor systems installed in the motor vehicle tire, not only in the laboratory or in the testing operation of a motor vehicle. It is rather possible to use the load-sensing system or ball and socket joint according to the present invention on a production vehicle as well for determining or adjusting the vehicle dynamics.

Thus, the present invention makes a substantial contribution to the better manageability of complex situations of measuring especially on the motor vehicle, as well as in other fields of application of the measuring technique.

While specific embodiments of the invention have been shown and described in detail to illustrate the application of the principles of the invention, it will be understood that the invention may be embodied otherwise without departing from such principles.

The invention claimed is:

1. A load-sensing system with at least one ball and socket joint, the ball and socket joint comprising:
    a joint ball pivot with a joint ball and a shaft area, said joint ball pivot having a cross hole arranged in said shaft area, said cross hole defining a passage extending from one side of said shaft area to another side of said shaft area;
    a joint housing, in which the joint ball of the ball pivot can be accommodated in a slidingly movable manner;
    a load-sensing means arranged in the shaft area of said joint pivot generating load signals based on a load sensed; and
    an evaluating means for receiving the load signals of said load-sensing means and providing an output in the form of a load vector or as a combination of load vector and torque vector in a cartesian coordinate system.

2. A load-sensing system in accordance with claim 1, wherein the origin of the load vector is the center of the joint ball.

3. A load-sensing system in accordance with claim 1, wherein said load-sensing means comprises a plurality of load sensors with each of said load sensors for sensing a load in one of different load directions.

4. A load-sensing system in accordance with claim 3, wherein said load sensors are arranged uniformly distributed on the circumference of the shaft area of the ball pivot.

5. A load-sensing system in accordance with claim 3, wherein said load sensors are arranged essentially in parallel to the direction of the longitudinal axis of said ball pivot.

6. A load-sensing system in accordance with claim 1, wherein at least one load sensor is arranged in an axial central hole of said ball pivot.

7. A load-sensing system in accordance with claim 1, wherein the load-sensing system comprises a plurality of ball and socket joints with a load-sensing means each.

8. A load-sensing system in accordance with claim 7, wherein the evaluating means is set up such that the signals of said load-sensing means of a plurality of said ball and socket joints are outputted in the form of a vector.

9. A load-sensing system in accordance with claim 8, wherein the origin of the vector is located in the center or the main reference point of a component or of an assembly unit of a motor vehicle.

10. A load-sensing system in accordance with claim 1, wherein the load-sensing system is part of an electronic stability program of a motor vehicle.

11. A load-sensing system in accordance with claim 1, wherein the load-sensing system is part of a means for monitoring the useful load of a motor vehicle.

12. A ball and socket joint, comprising:
    a joint housing;
    a ball pivot rotatable and/or pivotable in the joint housing, said ball pivot comprising a joint ball and a shaft area, said ball pivot having a cross hole located in said shaft area, said cross hole extending in a transverse direction of a longitudinal axis of said ball pivot;
    a cable comprising a plurality of connection cables, said cross hole receiving said cable; and
    a load-sensing means, comprising a plurality of load sensors, said load sensors being arranged in the shaft area of said ball pivot and being arranged distributed over the circumference of the shaft area, each load sensor being connected to one of said connection cables.

13. A ball and socket joint in accordance with claim 12, wherein said load sensors are designed as wire strain gauges.

14. A ball and socket joint in accordance with claim 12, wherein said load sensors are arranged on the surface of the shaft area of said ball pivot.

15. A ball and socket joint in accordance with claim 12, wherein recesses for receiving said load sensors are provided in the shaft area of said ball pivot.

16. A ball and socket joint in accordance with claim 15, wherein the shaft area of said ball pivot has plane surfaces for accommodating said load sensors.

17. A ball and socket joint in accordance with claim 12, wherein a load sensor is arranged in an axial central hole of said ball pivot.

18. A load-sensing system comprising:
    a ball and socket joint including a joint housing, a ball pivot rotatable and/or pivotable in the joint housing, said ball pivot comprising a joint ball, a shaft area, a first hole and a second hole, said first hole extending in said shaft area from one side of said ball pivot to another side of said ball pivot, said second hole being in communication with said first hole, said second hole extending in a longitudinal direction of said ball pivot, said first hole extending in a direction substantially perpendicular to said second hole;
    a load-sensing means comprising a plurality of load sensors, said load sensors being arranged distributed over a circumference of the shaft area at a spaced location from said first hole;
    an evaluating means for receiving the load signals of said load-sensing means and providing an output in the form of a load vector or as a combination of load vector and torque vector in a cartesian coordinate system; and
    a cable comprising a plurality of connection elements connected to said evaluating means, said cable extending through said first hole and said second hole, each load sensor being connected to said evaluating means via one of said connection elements.

19. A load-sensing system according to claim 18, wherein said evaluating means comprises a transmission matrix stored in advance and based on defined, known loads acting in defined directions and/or defined, known torques on the joint to provide a correlation between signals of the load-sensing means resulting from the known load or known torques and associated load vectors and torque vectors.

20. A load-sensing system according to claim 19, further comprising:
    a load state output device receiving said output in the form of a load vector or as a combination of load vector and torque vector in a cartesian coordinate system; and additional ball and socket joints, each including a joint housing, a ball pivot rotatable and/or pivotable in the joint housing, said ball pivot comprising a joint ball and a shaft area with plurality of load sensors, wherein said load sensors are strain gauges providing strain state information from each of said load sensors to said evaluating means.

21. A load-sensing system comprising:

a ball and socket joint including a joint housing, a ball pivot rotatable and/or pivotable in the joint housing, said ball pivot comprising a joint ball and a shaft area;

a load-sensing means comprising a plurality of load sensors, said load sensors being arranged distributed over a circumference of the shaft area; and an evaluating means for receiving the load signals of said load-sensing means and providing an output in the form of a load vector or as a combination of load vector and torque vector in a cartesian coordinate system, said evaluating means comprising a transmission matrix stored in advance and based on defined, known loads acting in defined directions and/or defined, known torques on the joint to provide a correlation between signals of the load-sensing means resulting from the known load or known torques and associated load vectors and torque vectors.

22. A ball and socket joint in accordance with claim 12, wherein said ball pivot comprises a threaded area and a longitudinal hole in communication with said cross hole, wherein said cable is received via said longitudinal hole in said threaded area such that said cable extends through said longitudinal hole and said cross hole.

* * * * *